United States Patent [19]

Ghisler

[11] Patent Number: 5,453,985
[45] Date of Patent: Sep. 26, 1995

[54] DIGITAL BIT ORIENTED SWITCH, GENERAL DIGITAL SWITCH AND PCM TRANSMISSION SYSTEM

[75] Inventor: Walter Ghisler, Upplands Väsby, Sweden

[73] Assignee: Telefonaktiebolaget LM Ericsson, Stockholm, Sweden

[21] Appl. No.: 293,938

[22] Filed: Aug. 22, 1994

Related U.S. Application Data

[63] Continuation of Ser. No. 15,395, Feb. 9, 1993, abandoned.

[30] Foreign Application Priority Data

Feb. 10, 1992 [SE] Sweden .................................... 9200384

[51] Int. Cl.⁶ ........................................................ H04Q 11/06
[52] U.S. Cl. ................................................. 370/63; 370/59
[58] Field of Search ................................. 370/58.1, 58.2, 370/59, 63–64, 58.3, 68, 60, 94.1

[56] References Cited

U.S. PATENT DOCUMENTS

| | | | |
|---|---|---|---|
| 3,959,596 | 5/1976 | Bojanek et al. | 370/59 |
| 4,644,535 | 2/1987 | Johnson et al. | 370/58.1 |
| 4,661,946 | 4/1987 | Takahashi et al. | 370/58.1 |
| 4,718,058 | 1/1988 | van Vugt | 370/63 |
| 4,999,832 | 3/1991 | Chen et al. | 370/58.1 |
| 5,005,170 | 4/1991 | Nelson | 370/58.1 |
| 5,128,929 | 7/1992 | Kobayashi | 370/58.1 |
| 5,136,579 | 8/1992 | Nguyen | 370/59 |
| 5,237,565 | 8/1993 | Hennion et al. | 370/60.1 |

*Primary Examiner*—Douglas W. Olms
*Assistant Examiner*—Huy D. Vu
*Attorney, Agent, or Firm*—Burns, Doane, Swecker & Mathis

[57] ABSTRACT

A bit oriented digital switch for controlled change of bit position and PCM word of chosen bits and bit groups in PCM words received by the switch. The switch is suitable to combine with a conventional word oriented switch to allow flexible switching of both entire PCM words and parts thereof. This switch also makes it possible to define a digital PCM transmission system, in which PCM words can contain one or several traffic channels and in which traffic channels that, occupy a bit group containing at least one bit, but not an entire PCM word, dynamically are allocated necessary space at an arbitrary available location in PCM words.

5 Claims, 3 Drawing Sheets

5,453,985

DIGITAL BIT ORIENTED SWITCH, GENERAL DIGITAL SWITCH AND PCM TRANSMISSION SYSTEM

This application is a continuation of Application Ser. No. 08/015,395, filed Feb. 9, 1993 now abandoned.

TECHNICAL FIELD

The present invention relates to a bit oriented digital switch, a general digital switch and a PCM transmission system in which these switches can be used.

BACKGROUND OF THE INVENTION

PCM transmission systems (PCM=Pulse Code Modulation), for instance telecommunication systems, are characterized in that information in a digital representation is transmitted in time slots. Each time slot transmits a predetermined number of bits, usually 8 bits. In conventional telephone systems these 8 bits are reserved for a channel. A predetermined number of such time slots (32 in Europe, 24 in the United States) are transmitted over a common PCM transmission link. In other words, a channel has access to a certain time slot, whereafter the channel is "silent" while the other channels have access to their respective slots. After the mentioned predetermined number of slots the channel once again has access to its time slot. Such a PCM transmission link, for instance a "PCM primary multiplex" in accordance with CCITT recommendation G732, G733, has a transfer rate of 64 k/bits (both in Europe and the United States).

In digital mobile telephony, speech information is coded by a speech coder in such a way that a lower transfer rate over the radio connection is obtained. In, for instance, the Group Special Mobile or GSM system, a transfer rate of less than 16 kbit/s, that is one fourth of the normal PCM transmission rate, is obtained. In this case, one channel occupies only two bits in a PCM word. In order to prevent the remaining bits from being unused, it has therefore been suggested that four such coded channels are packed into a PCM word that is sent to the public telephone network. This packing can for instance be done in a mobile services switching center.

In the future, there will also be so called "half rate" channels with a transfer rate of less than 8 kbit/s, which will require only one of the eight bits in a PCM word. In this case, it would also be desirable to pack several "half rate" channels in one and the same PCM word.

Furthermore, wirebound telephone systems are expected to use radio connections more and more also in the subscriber network itself, in which case the same code for speech will be used as in mobile telephony. In connection with a transfer from radio terminal to radio terminal in such systems and in cellular systems it would be desirable to maintain the compacter coding during the whole transfer path.

Data traffic with data rates less than 64 kbit/s have actually been switched in PCM networks by using the available words in a multiframe configuration (see CCITT recommendation V.100). However, multiframes introduce delays that may be tolerable for data but not for speech. For this reason, speech transmission with lower transfer rates than 64 kbit/s preferably should use one or two bits in a PCM channel rather than a word in a PCM multiframe.

Accordingly, there is a need for arbitrary switching of parts of a PCM word in such a way that the eight bits of the word are maximally utilized. This requires a bit oriented switch as a supplement to the word oriented switches of today.

U.S. Pat. No. 4,718,058 discloses a general switch capable of switching on both the word and bit level. However, this complicated general switch is supposed to replace existing switches for bit level switching capability. Thus, it is not intended to supplement existing switches with switching capabilities at bit level.

SUMMARY OF THE INVENTION

Thus, one object of the present invention is a bit oriented switch enabling the combination of several channels occupying only a part of a PCM word in new PCM words for transfer over the public telephone network.

In accordance with the invention this object is achieved by a switch comprising (a) N speech memories, where N is the number of bits in a PCM word, for storing the received PCM words and N-1 copies thereof;

(b) means for controlled selection of one PCM word from each speech memory;

(c) N word memories for storing the selected PCM words; and (d) means for controlled selection of one bit from each word memory for forming a new PCM word as the output of said bit oriented digital switch.

Another object of the invention is a general digital switch for PCM transmission systems.

In accordance with the invention such a switch comprises a word oriented digital switch for switching entire PCM words and at least one bit oriented digital switch connected thereto for receiving PCM words from said word oriented digital switch, for changing bit position and PCM word of selected bits and bit groups in the received PCM words and for outputting these new PCM words to said word oriented digital switch.

BRIEF DESCRIPTION OF THE DRAWINGS

The invention, together with further objects and advantages thereof, may best be understood by making reference to the following description taken together with the accompanying drawings, in which.

DETAILED DESCRIPTION OF THE PREFERRED EMBODIMENTS

In the different figures the same reference designations have been used for corresponding elements.

Figure 1:
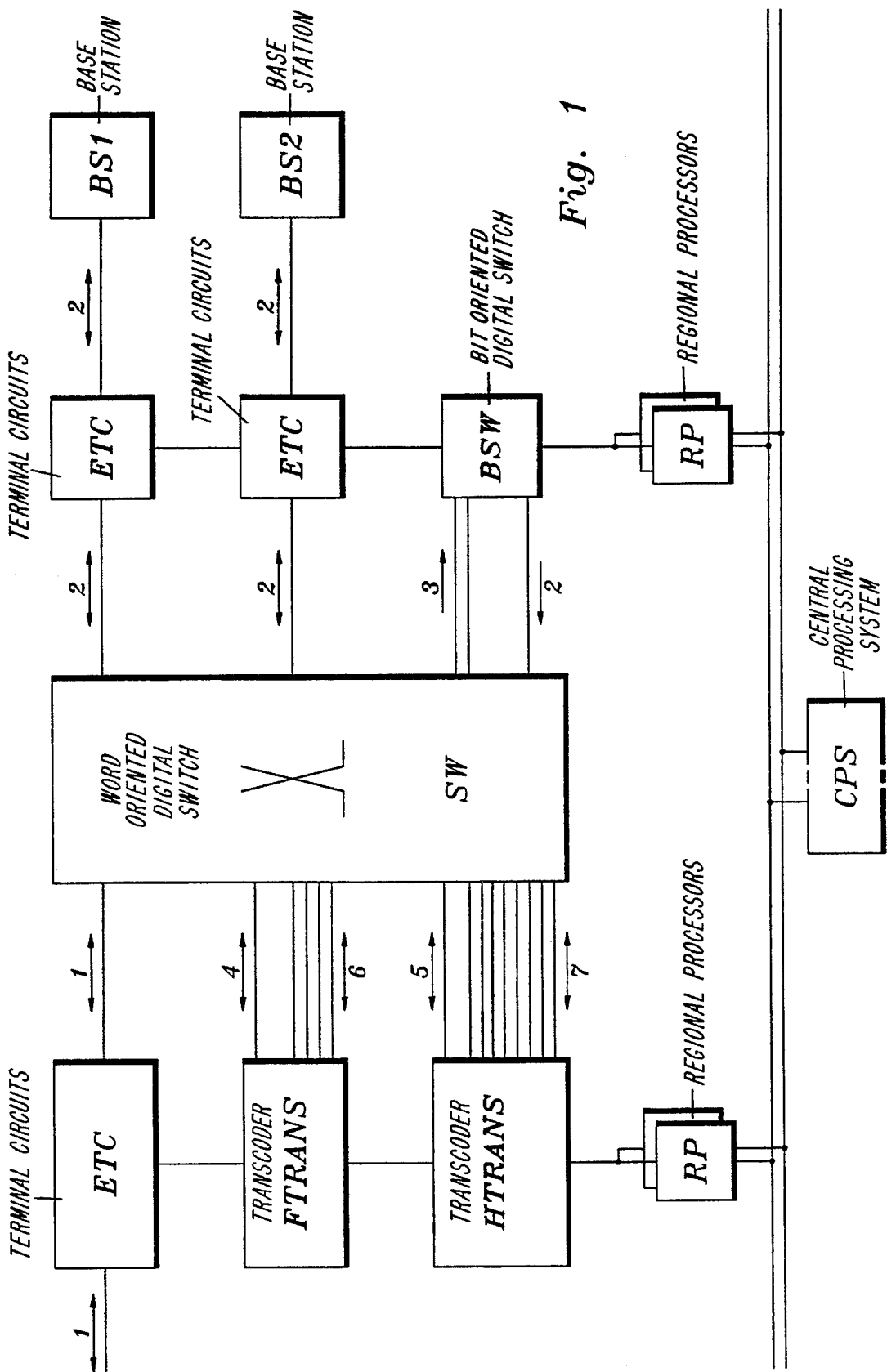
FIG. 1 shows a general digital switch in accordance with the invention comprising both a word oriented digital switch and a bit oriented digital switch.

FIG. 1 shows a general digital switch in accordance with the present invention. This switch can for instance be a part of a mobile services switching center. The switch comprises a conventional word oriented digital switch SW, for instance a GSS unit (Group Selector Subsystem) in the AXE switching system from LM Ericsson. Suitable switches are for instance the type that are included in AXE group selectors. Switch SW is over terminal circuits ETC connected to the public telephone network and to base stations BS1, BS2, respectively. In the example only two base stations are shown, but in practice there can be more base stations. The exchange is controlled in a conventional way by regional processors RP and a central processor system CPS.

Figures 2, 3:
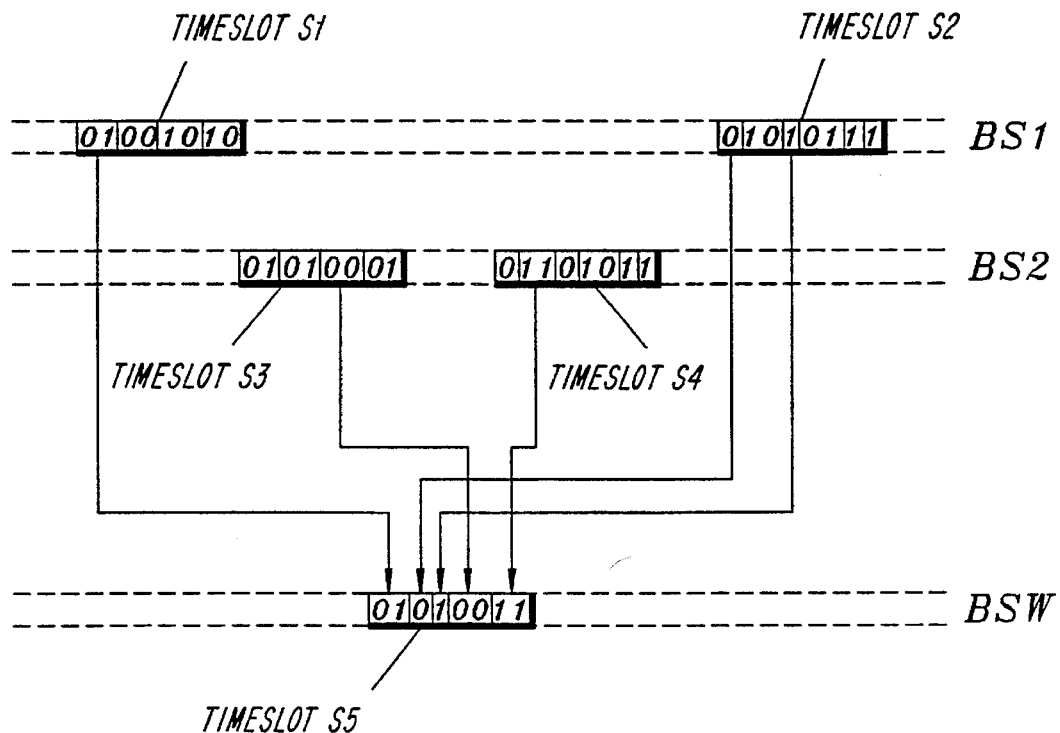
FIG. 2 shows the possible formats of signals in different parts of the general digital switch in FIG. 1.
FIG. 3 shows an example of how parts of PCM words can be put together in the bit oriented digital switch of the general digital switch of FIG. 1.

In FIG. 1, the signal types that occur in different parts of the system have been marked by the numbers 1–7 at the corresponding arrows. The double pointed arrows symbolize that communication can occur in both directions, while the single pointed arrows symbolize communication in only the indicated direction. The format of the different signal types is shown in FIG. 2. Signal type 1 is the most general signal type and comprises all categories A–F in FIG. 2. Here category A relates to conventional PCM channels that occupy an entire word. Category B relates to a PCM word that contains one channel that occupies only two of the eight bits of the PCM time slot. The remaining bits are unused. In a similar way, category C contains one channel occupying only one bit, while the remaining seven bits in the PCM time slots are unused category D contains four packed channels each containing two bits, that is, an entire PCM word is used. In a similar way, category E shows a PCM word filled with eight channels each containing one bit. Finally, category F shows a PCM word that has been filled with different types of compact channels, that is, channels occupying one bit and also channels occupying two bits.

In the upper left part of FIG. 1, switch SW is over a terminal circuit ETC connected to the public telephone network. Here all the signal categories A–F can occur, that is the input and output signals are of type 1.

The upper right corner of FIG. 1 contains base stations BS1 and BS2. These transfer signals of type 2 are sent over terminal circuits ETC to and from switch SW, respectively. This signal type contains only the packed signal categories D–F, that is, signals where several channels share a PCM word.

The mobile services switching center in FIG. 1 also contains a transcoder FTRANS for packing/unpacking of "full rate" channels, that is, channels that require only two bits per PCM word. In the unit FTRANS, four signals of type 6 can be received. If these signals are of category A, they are compressed in FTRANS and returned to switch SW as a word of signal type 4, that is, of category D. Already compressed signals of category B are received by unit FTRANS and assembled without further compression to signal category D. A reverse unpacking of signals of type 4 to outgoing signals of type 6 can also be performed in unit FTRANS.

In a similar way, there is a unit HTRANS for packing of "half rate" channels, which can receive eight signals of type 7 and pack these signals into a common PCM time slot. Unpacking is also performed in the other direction.

The mobile services switching center described so far is characterized in that only entire PCM words can be processed in switch SW. It is true that compressed signals of the same type can be packed in units FTRANS and HTRANS, but these signals cannot be mixed in an arbitrary way.

In order to perform such a mixing, signals must be combined on bit level rather than on word level. In accordance with the invention, the general switch of FIG. 1 therefore includes a bit oriented digital switch BSW. Over word oriented switch SW, this bit oriented switch receives signals of type 3 over several input lines, that is, signals of categories B–F in FIG. 2. These signals contain different mixtures of compressed channels that require less than an entire PCM word. The purpose of the bit oriented digital switch BSW is to change bit position and PCM word for these channels on bit level instead of on word level, and thereafter to output signals of type 2 to word oriented switch SW. How this is performed will be further described with reference to FIG. 4.

FIG. 3 shows an example of how parts of PCM words can be put together in bit oriented digital switch BSW in FIG. 1. Two PCM time slots S1 and S2 from base station BS1 over word oriented switch SW reach bit oriented switch BSW on, for instance, the upper input line to switch BSW. In a similar way, two time slots S3 and S4 from base station BS2 over word oriented switch SW reach bit oriented switch BSW on the lower input line to switch BSW. However, it is to be noted that it is not necessary that, for instance, PCM words from BS1 reach the upper line. With word oriented switch SW, a PCM word from an arbitrary source can be connected to an arbitrary input of bit oriented switch BSW. In bit oriented switch BSW, the relevant bits of the compressed channels that one wishes to combine to a new PCM time slot S5 are extracted, wherein the new time slot is sent back to the word oriented switch SW for further switching to the public telephone network. In other words, the bit oriented switch BSW gives the possibility to optimally use the space in available PCM words.

In the example of FIG. 3, both PCM links come from base stations. However, the bit oriented digital switch BSW can also receive signals from the public telephone network, that is, all signals from categories B–F can be received.

Figure 4:
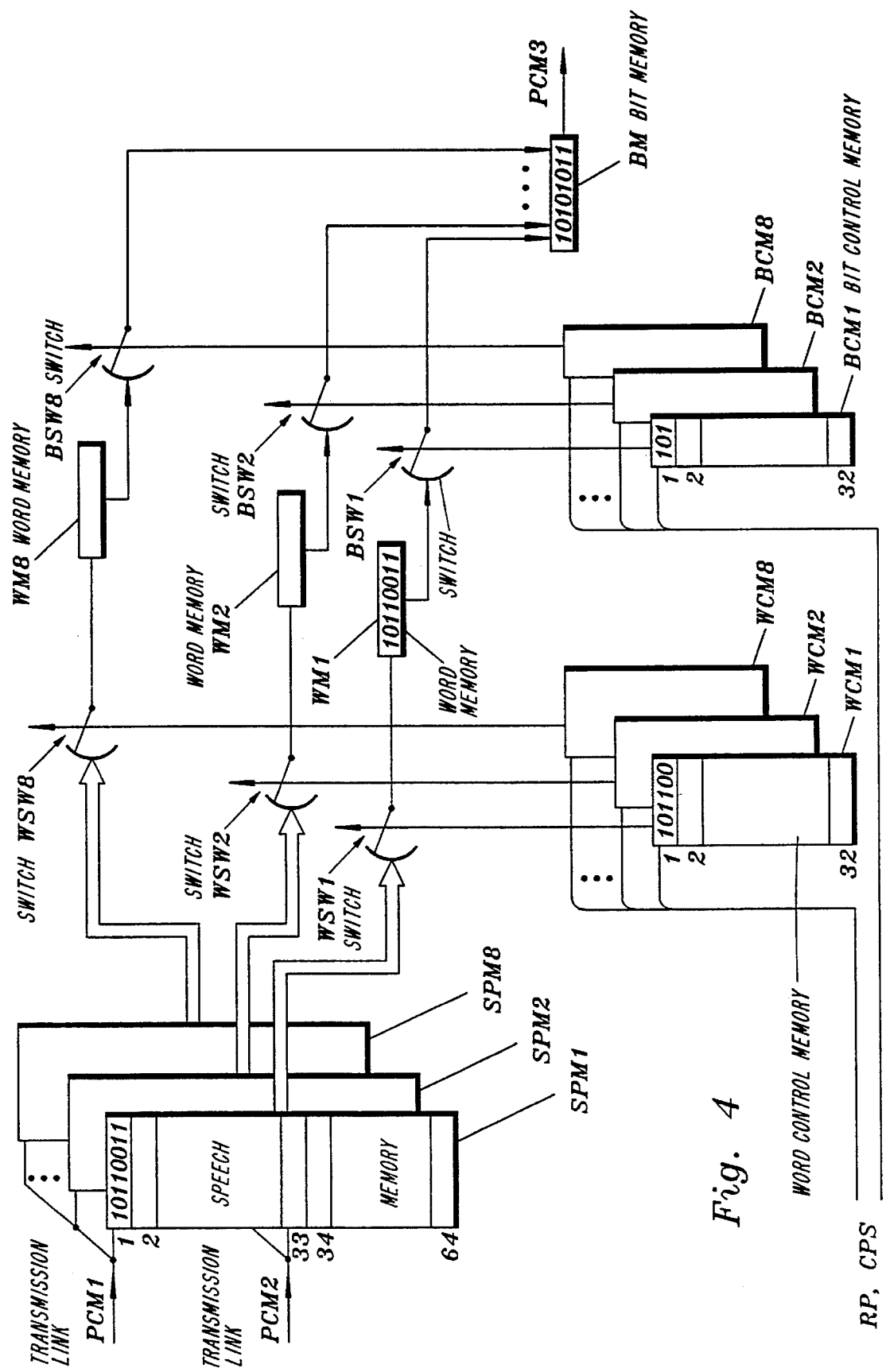
FIG. 4 shows a preferred embodiment of bit oriented digital switch in accordance with the present invention.

FIG. 4 shows a preferred embodiment of a bit oriented digital switch in accordance with the invention suitable to be used in the general digital switch of FIG. 1.

The bit oriented digital switch in FIG. 4 comprises a speech memory SPM1 that continuously is supplied with time slots from the incoming PCM transmission links PCM1 and PCM2. In, for instance, the European PCM system, the latest 32 time slots of the two transmission links PCM1 and PCM2 will therefore be available in speech memory SPM1. Further to the speech memory SPM1 the switch of FIG. 4 also comprises the speech memories SPM2, . . . , SPM8, that is, seven further speech memories. In these speech memories, copies of the time slots stored in the speech memory SPM1 are stored. At each moment in time, eight copies of 64 PCM time slots are therefore available.

The switch of FIG. 4 also comprises eight word control memories WCM1, WCM2, . . . , WCM8. These control memories control respective switches WSW1, WSW2, . . . , WSW8 for outputting one of the 64 PCM time slots from each speech memory SPM1, SPM2, . . . , SPM8. For this purpose, the word control memories contain 32 memory cells, each containing six bits ($2^6$=64 possible addresses in speech memories SPM1, SPM2, . . . , SPM8). These word control memories are controlled by control signals from the regional processors RP and the central processor system CPS.

If one wishes to combine more than two PCM transmission links, for instance four links, the length of the speech memories can be extended to 128 memory cells. At the same time, the word length in the word control memories has to be extended to seven bits. However, the number of cells in the word control memories still remains 32 cells, since bit oriented switch BSW outputs only one PCM transmission link. Another possibility to combine bits from four links is to let the word oriented switch SW select the PCM words in question and send these words to the bit oriented BSW on its two input lines. In certain cases, for instance, if only packed PCM words are to be switched, the bit oriented switch can also be provided with only one input and one output. However, one reason that the bit oriented switch preferably has fewer outputs than inputs (that is performs traffic concentration) is that the output contains packed PCM information, where as many bits as possible are used in the same word, whereas not all bits in the incoming PCM words need to contain information and therefore not all bits will be switched to outgoing PCM words.

The words selected from the speech memories are transferred to word memories WM1, WM2, ..., WM8. From the obtained eight words one bit position from each word is selected by switches BSW1, BSW2, ..., BSW8 controlled by bit control memories BCM1, BCM2, BCM8. These control memories are also controlled by regional processors RP and a central processor system CPS. Since in this case only one bit is to be selected from each word, the memory cells in the word control memories BCM1, BCM2, ..., BCM8 contain only three bits. The selected bits are collected in a bit memory BM that stores the formed time slot of the outgoing PCM transmission link PCM3.

The necessary cyclic control procedure of speech and control memories is well known for a person skilled in the art and is performed, for instance, in the way that is described in the documentation of the AXE system. Signalling in the network can be performed in accordance with CCITT signalling system No. 7.

If several bits in one incoming PCM word to the bit oriented switch BSW are to be transferred to an outgoing PCM word, the incoming word is selected several times from the speech memories SPM1, SPM2, ..., SPM8, so that each desired bit can be selected from a respective copy.

However, if several bits in an incoming PCM word to the bit oriented switch BSW are to be distributed over several outgoing PCM words, the incoming PCM word is chosen repeatedly from the speech memories SPM1, SPM2, ..., SPM8 with a time delay of one or several time slots.

It is to be noted that the two transmission directions between two subscribers have to be treated separately in the bit oriented switch BSW, in contrast to normal PCM word switching, where the two directions share the same control memory information (see for instance AXE GSS documentation).

The bit oriented switch in accordance with the present invention also gives the possibility of semi-permanent connections through the network of speech connections with a transfer rate of 64 kbit/s, but divided into connections of less than 64 kbit/s. For instance, a PCM channel from a mobile services switching center to another mobile services switching center over the public telephone network can be used for eight "half rate" speech channel connections between the two mobile services switching centers. When a call is terminated one bit position becomes available in the corresponding PCM word and can be assigned a new call between the two mobile services switching centers without requiring that a new 64 kbit/s connection has to be established. Thus, the division of the PCM word can be considered as a submultiplex. The advantage of semi-permanent 64 kbit/s connections is that the network in question as previously switches only 64 kbit/s and not slower channels. If connections are desired between mobile telephone services switching centers of the same brand, a vendor specific signalling can be used, since establishing of a semi-permanent 64 kbit/s connection can be performed in accordance with present CCITT signalling system No. 7. If, however, one desires a connection between mobile services switching centers of different brands, a supplement standard, for instance in CCITT signalling system No. 7, is required for the necessary signalling.

From the above description it is appreciated that the bit oriented switch in accordance with the present invention enables arbitrary change of both position and PCM word for bits or bit groups that do not fill an entire PCM word. This makes it possible to define a completely new digital PCM transmission system in which traffic channels that occupy a bit group containing at least one bit, but not an entire PCM word, dynamically are allocated required space in an arbitrary available position in PCM words. For instance, it becomes possible to define traffic channels that contain three or five bit positions in a PCM word. These new channels can in the bit oriented digital switch in accordance with the invention be combined with already defined compressed traffic channels for transfer over conventional word oriented PCM transmission links.

If one bit oriented switch BSW in not sufficient for the expected or observed traffic load, one or several further bit oriented switches can be installed or the traffic can be directed to another node with bit oriented switches.

It will be understood by those skilled in the art that various modifications and changes may be made to the present invention without departure from the spirit and scope thereof, which is defined by the appended claims.

I claim:

1. A bit oriented digital switch for PCM transmission systems, for controlled change of bit position and PCM word of selected bits and bit groups in PCM words received by said switch, said switch comprising:
   (a) a first plurality of speech memories for storing the received PCM words, where said plurality is the number of bits in a PCM word, and where each received PCM word is stored once in each of said speech memories;
   (b) means for controlling selection of one PCM word from each speech memory;
   (c) a second plurality of word memories, where said second plurality is the number of bits in a PCM word, for storing the selected PCM words; and
   (d) a third plurality of bit memories;
   (e) means for controlling selection of one arbitrary bit from each word memory for forming a new PCM word in said bit memories as an output of said bit oriented digital switch.

2. A bit oriented digital switch in accordance with claim 1, wherein each of said PCM words comprise eight bits.

3. A general digital switch for PCM transmission systems for switching of PCM words on both word and bit level, comprising:
   a word oriented digital switch with a plurality of inputs and a plurality of outputs for space and time switching entire PCM words received from components in a PCM transmission system, and
   at least one bit oriented digital switch connected to said word oriented digital switch for receiving PCM words from said word oriented digital switch, for changing bit position and PCM word of selected bits and bit groups in the received PCM words and for outputting these new PCM words to said word oriented digital switch.

4. The general digital switch in accordance with claim 3, further comprising means for determining when demand for switching on the bit level increases, wherein further bit oriented digital switches are being connected to said word oriented switch when the demand for switching on bit level increases.

5. The bit oriented digital switch in accordance with claim 1, wherein said means for controlling selection of one PCM word is controlled by a regional processor and a central processor.

* * * * *